Aug. 19, 1958 — L. HAMM — 2,847,720
ELEVATABLE PROTECTIVE SHELL FOR VEHICLES
Filed Sept. 14, 1956 — 5 Sheets-Sheet 1
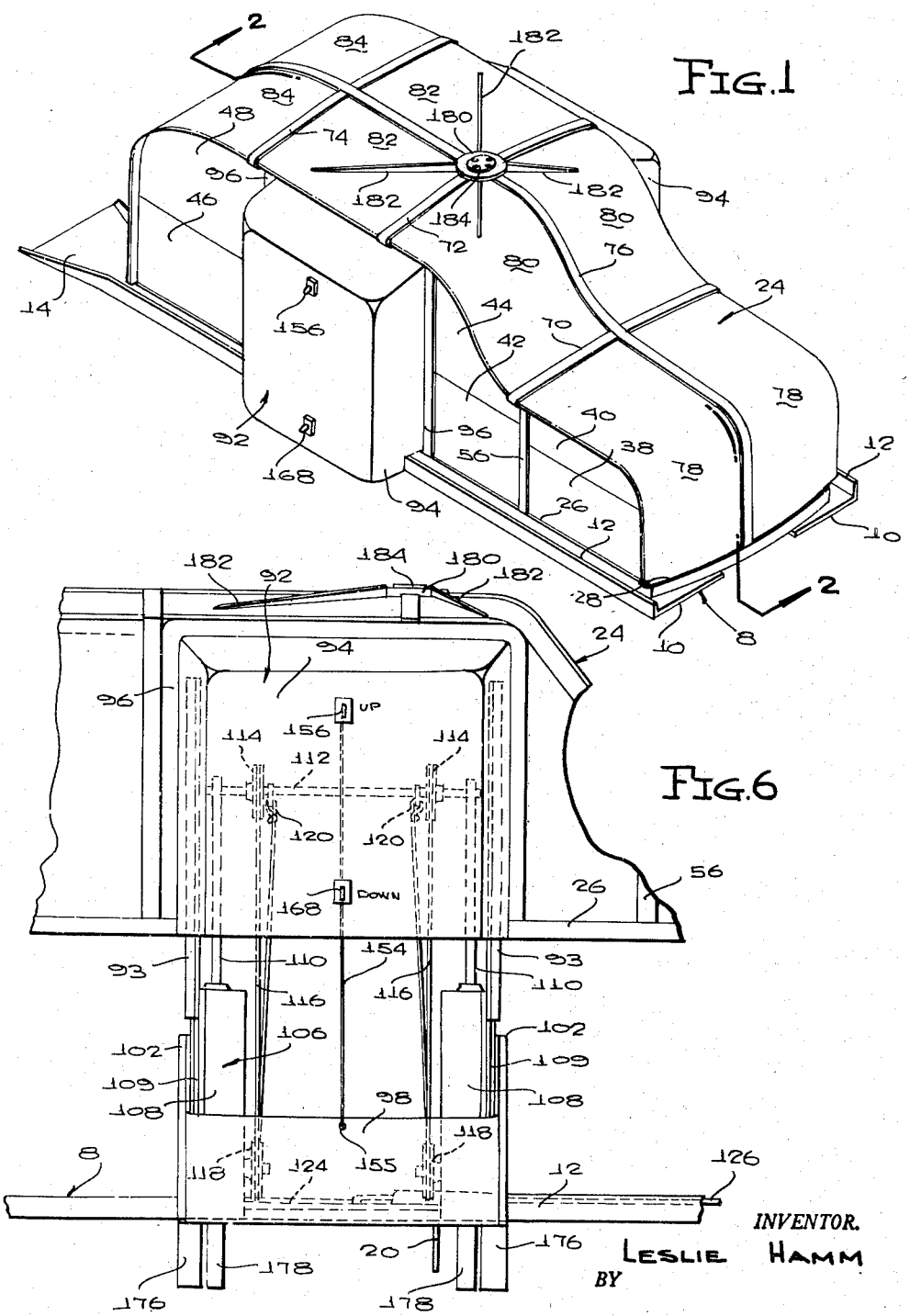
INVENTOR.
LESLIE HAMM
BY
McMorrow, Berman & Davidson
ATTORNEYS

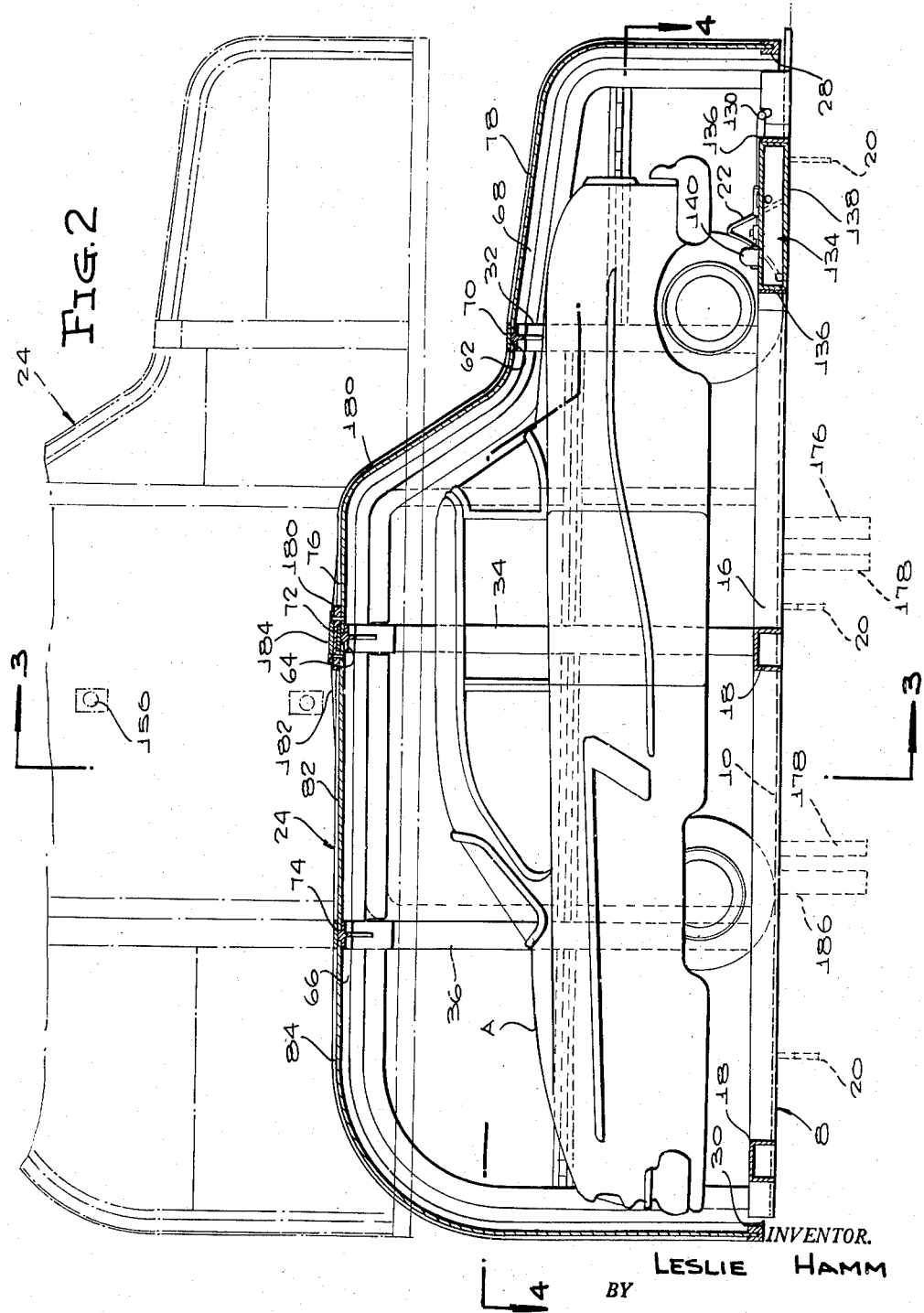

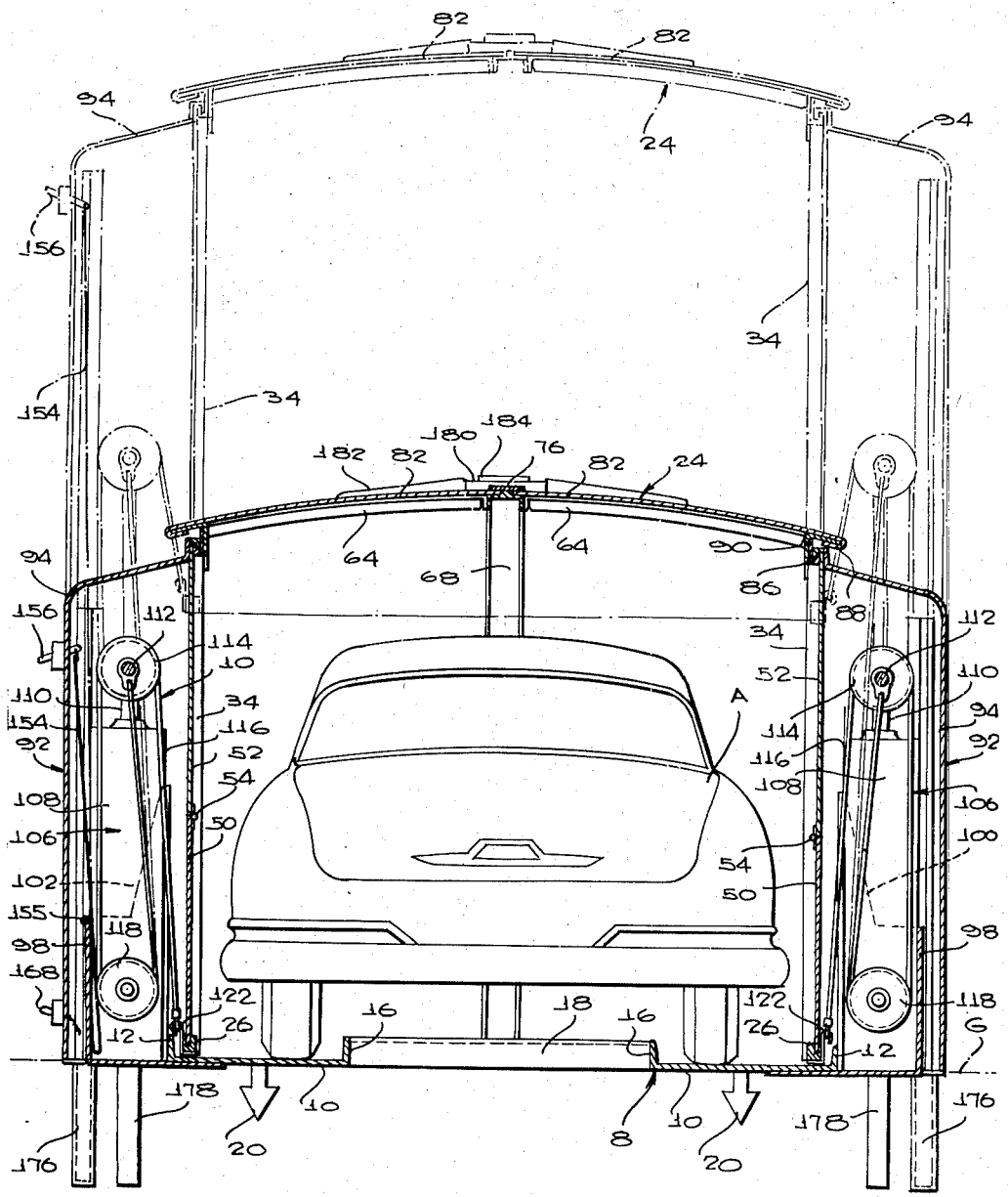

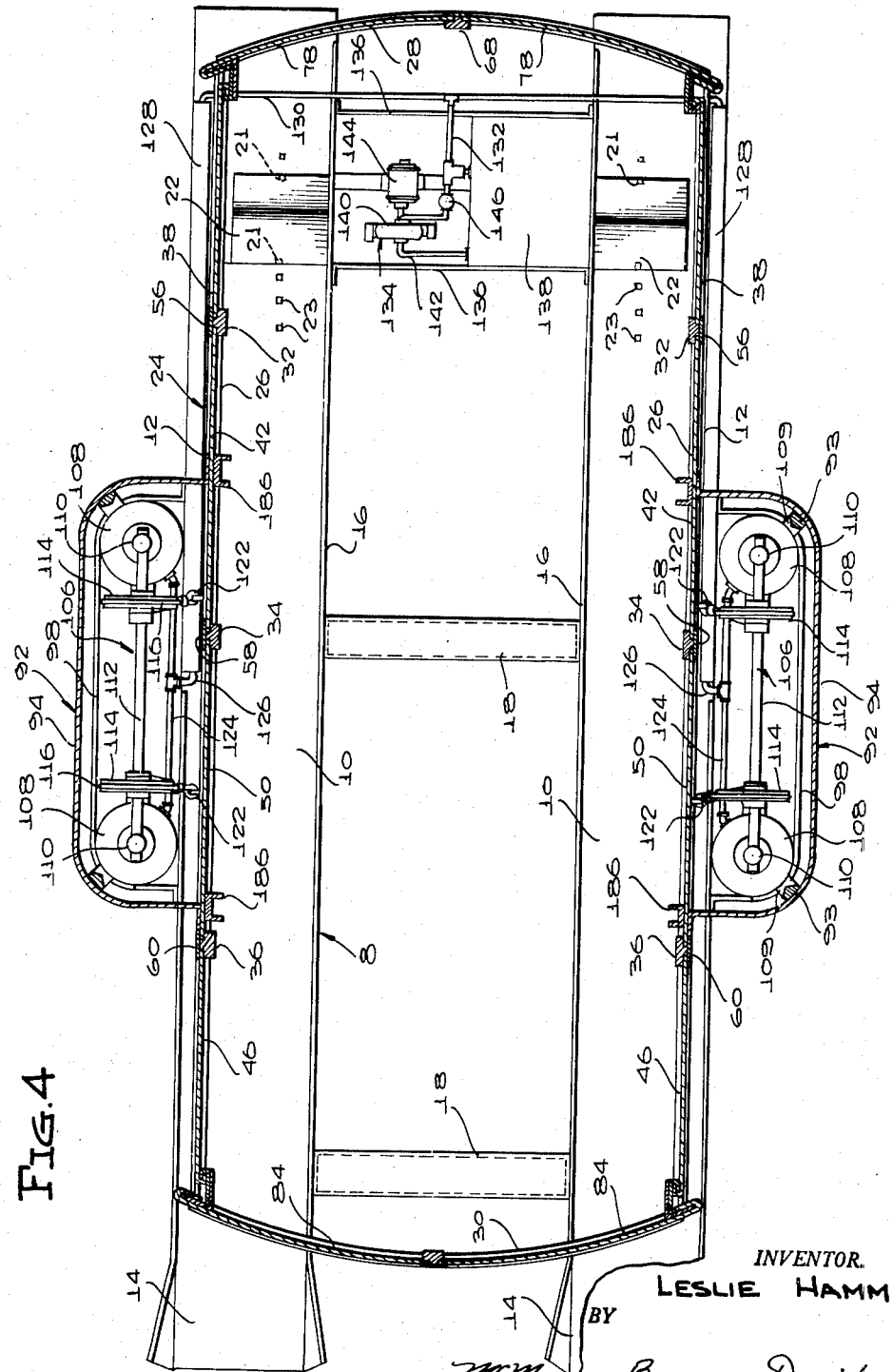

Aug. 19, 1958
L. HAMM
2,847,720
ELEVATABLE PROTECTIVE SHELL FOR VEHICLES
Filed Sept. 14, 1956
5 Sheets-Sheet 5
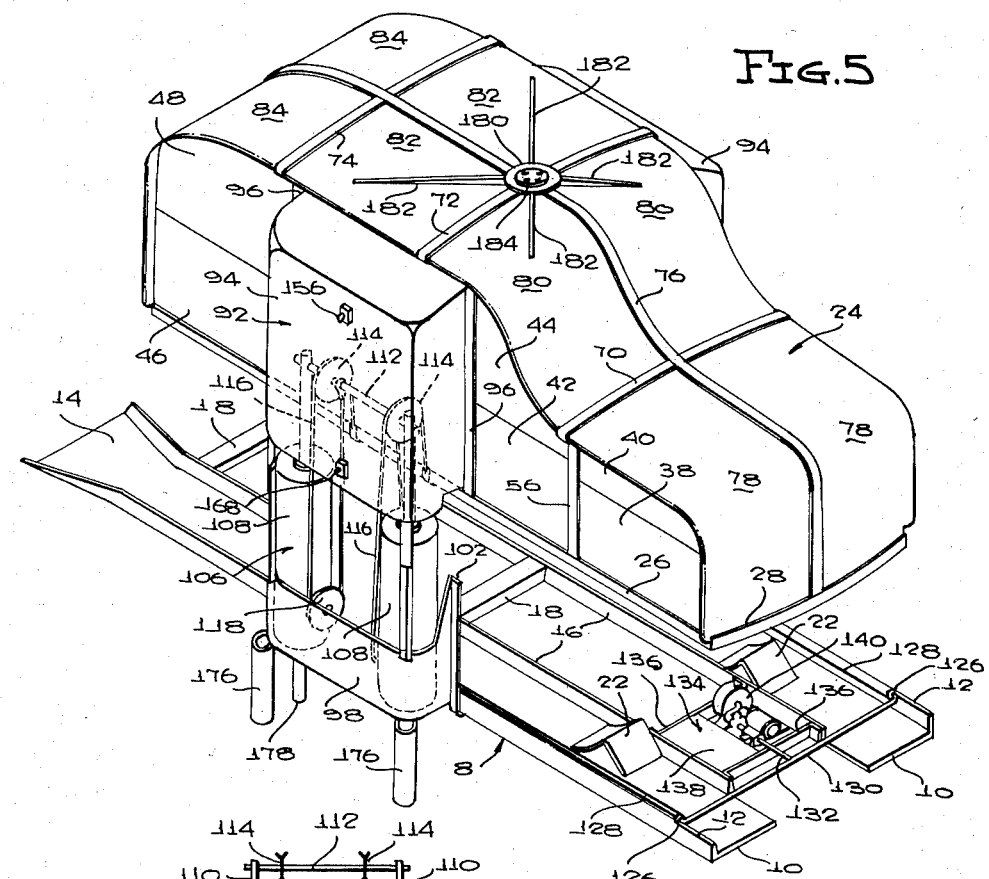
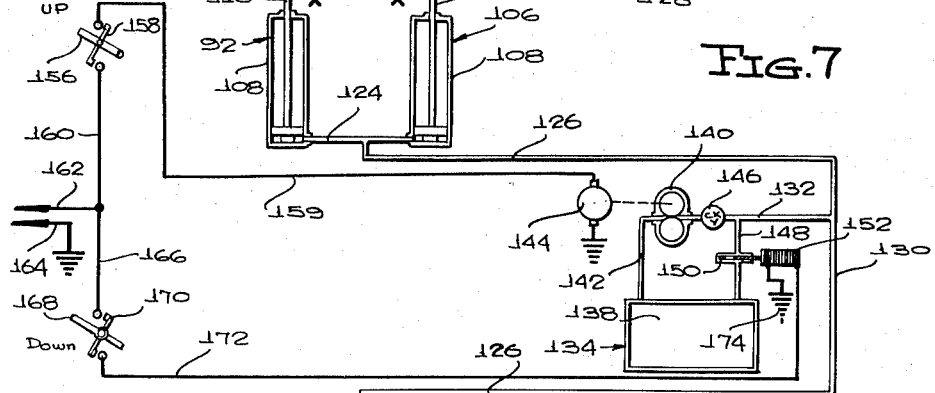
INVENTOR.
LESLIE HAMM
BY
McMorrow, Berman & Davidson
ATTORNEYS

# United States Patent Office 2,847,720
Patented Aug. 19, 1958

2,847,720

ELEVATABLE PROTECTIVE SHELL FOR VEHICLES

Leslie Hamm, Boston, Mass.

Application September 14, 1956, Serial No. 609,901

5 Claims. (Cl. 20—1.13)

In accordance with the present invention, a compact, rigid, sectionally constituted shell or enclosure, little greater in size than an automobile or other vehicle to be covered thereby, and having a configuration roughly approximating that of the vehicle and particularly designed for the shedding of rain and snow, overlies a runway onto which the vehicle may be driven. Through operation of electric switches, the entire enclosure is elevated a distance sufficient to permit the vehicle to be driven onto or off the runway, and mechanism is included in the invention for dropping the enclosure back to its normal, lowered position following its elevation.

The broad object of the invention is to provide a vehicle protecting structure which will discharge with full efficiency the corresponding functions of a full sized garage.

The erection of a garage is normally a comparatively expensive operation, and in addition, the conventional garage occupies a substantially great amount of space in one's property. Most usually, arrangements must be made with a building contractor, and a comparatively large amount of material must be purchased, accompanied by the hiring of various artisans or building trades workers, all of which contributes measurably to the total expense involved. It is proposed to obviate such heavy expenses and inconviences by the provision of an enclosure which will protect a vehicle completely from the elements, while still being capable of being purchased as a unit that can be swiftly and easily installed in a relatively small amount of space.

Corollary to the object stated immediately above is a further object of the invention, the provision of an enclosure as described which will be designed to be manufactured in quantity, by mass production at one or more factories or assembly plants, and thereafter shipped in wholly or partially disassembled condition to a purchaser, for assembly on the site at which the enclosure is to be used, this characteristic of the invention being adapted to permit its manufacture at a comparatively low cost, considering the benefits to be obtained from the use of the device.

Another object is to provide an enclosure as described which will be adapted to fit about all standard makes of vehicles, without requiring their modification or redesign.

Still another object is to so design the mechanism for elevating and lowering the enclosure as to permit the enclosure to be lifted, as well as lowered, responsive merely to the throwing of a conveniently located switch.

A more specific object is to form the shell of the device in a manner such as to permit its manufacture in preformed sections, readily assembled on the site to provide the completed shell.

Still another object is to form a vehicle-protective shell as described so designed that it will be possessed of a high degree of ruggedness, durability, resistance to deterioration on exposure to the elements, and adaptability for usage over a long period of time with a minimum of maintenance and repair.

Other objects will appear from the following description, the claims appended thereto, and from the annexed drawing, in which like reference characters designate like parts throughout the several views, and wherein:

Figure 1 is a perspective view of the structure in its lowered, vehicle-protecting position;

Figure 2 is an enlarged longitudinal sectional view substantially on line 2—2 of Figure 1, the dotted lines showing the enclosure in its raised position;

Figure 3 is a transverse sectional view, on the same scale as Figure 2, taken substantially on line 3—3 of Figure 2;

Figure 4 is a horizontal section, on the same scale as Figure 2, taken substantially on line 4—4 of Figure 2;

Figure 5 is a view like Figure 1 in which the shell has been raised;

Figure 6 is a fragmentary side elevational view of the device with the shell in elevated position; and Figure 7 is a schematic view illustrating the fluid pressure and electrical lines of the invention.

As one of the components of the structure, the invention includes a runway generally designated 8. This includes like, parallel, transversely spaced tracks 10 having wide, flat webs onto which may be driven a vehicle A. Extending the full length of the webs, and extending upwardly from the outer longitudinal edges thereof, are low outer walls 12 of the tracks. At one end, the tracks have flared entranceways 14 which may if desired be shallowly inclined, although this is not necessary in view of the fact the webs (see Figure 3) rest in direct contact with, that is, in the plane of the ground surface. Low inner side walls 16 extend upwardly from the inner longitudinal edges of the webs of the tracks, and terminate a short distance inwardly from the forward extremities of the tracks.

Rigidly connecting the tracks in their laterally spaced, parallel relation are channeled cross braces 18, spaced longitudinally of the tracks, one being disposed substantially intermediate opposite ends of the runway and the other being disposed forwardly a short distance from the flared entranceways of the tracks as best shown in Figure 4. The number of cross braces could be varied as desired, as well as the location of the same.

Further, although not specifically illustrated, the respective tracks can be sectionally constituted, so as to permit their assembly on the site at which the enclosure is to be used. In this event, end-abutting sections of the respective tracks would be connected by splice plates or the like. This is thought sufficiently obvious as not to require special illustration herein.

Rigid with and depending from the tracks (see Figures 2 and 3) are triangularly tipped ground anchors 20 formed from lengths of rigid bar stock and spaced longitudinally of the tracks. In the illustrated example, ground anchors extend vertically downwardly from the web of each track, one near the front, one near the rear end, and one substantially medially between the opposite ends thereof.

When the runway is being installed, after its assembly it need merely be placed upon the ground surface, after which the vehicle is driven thereonto, thus causing the ground anchors to be forced inwardly into the ground to firmly anchor the runway in the desired position. It is seen that the ground need not be specially prepared, excavated, or provided with a concrete base for the purpose of installing the runway, this being a desirable feature of the invention promoting its use as a wholly self-contained structure that requires little preparation, in advance, of the site on which it is to be erected.

Spaced inwardly along the lengths of the tracks (Figure 4) from the forward extremities thereof are metal shocks 22 which as shown in Figure 2 are substantially of inverted U-shape, and are adapted to limit the forward movement of the vehicle upon the runway beyond a position in which the vehicle is properly disposed for movement of the protective shell downwardly into a vehicle-protecting position. The shocks can be adjustably located, according to the length of the particular vehicle, and this may be readily achieved by providing depending tongues 21 on the leading and trailing edges of the chocks, adapted to seat in any of a series of openings 23 longitudinally spaced along the associated tracks. The tongues (Figure 4) are integrally formed upon the respective chocks.

This completes the construction of the runway 8. There will now be described the vehicle-protective shell, which has been generally designated at 24 in the several figures of the drawings.

As seen from Figures 1 and 5, the shell may appropriately be termed as being in the approximate contour of an automotive vehicle, that is, the shell has a depressed forward end portion that fits over the hood of the vehicle, and a higher body portion that overlies the passenger compartment and rear end of the vehicle. This contour, it may be noted, has the further characteristic of swiftly shedding snow or rain, due to the transverse and longitudinal curvatures of the various portions of the shell.

The shell may be formed in individual sections, capable of assembly on the site. This again facilitates shipment of the entire structure in a relatively compact form.

The shell includes longitudinally extending base rails 26 (Figures 1 and 3) which in the lowered position of the shell are spaced inwardly a short distance from the outer side walls 12 of the respective tracks 10. Base rails 26 at their forward ends are connected by a forwardly bowed front base rail 28 (Figures 4 and 5) while at their rear ends, the base rails are similarly fixedly connectable to a rearwardly bowed rear base rail 30.

The shell thus has a bottom frame lying in a horizontal plane, constituted by the side base rails 26 and the end base rails 28, 30, and the several rails are formed with upwardly opening, longitudinal grooves extending from end to end thereof.

Reinforcing the sides of the shell (see Figure 4) are vertically extending side reinforcing posts 32, 34, 36 spaced longitudinally of the shell, corresponding posts of the respective sides being aligned transversely of the shell. Referring now to Figures 1 and 5, the sides of the shell are formed by pairs of panels 38, 40; 42, 44; 46, 48; and 50, 52 (see Figure 3). The panels of each pair, in the completed condition of the shell, are in a common vertical plane. Initially, however, the panels of each pair are hingedly connected along their horizontally extending, abutting edges. This is shown, in a typical example, in Figure 3 wherein a hinge 54 connects panels 50, 52. Again, this is for the purpose of facilitating shipment of the shell in a substantially flat package of superposed panel sections. In erection of the shell, the hingedly connected panels of each pair are so disposed that the bottom edge of the lower panel of the pair and the top edge of the upper panel of the pair may engage in confronting grooves of the shell-supporting frame. Thereafter, pressure is exerted against the hingedly connected panels shifting the hingedly connected edges laterally inwardly of the shell, so as to move the hinged panels into a common vertical plane, with the mentioned bottom and top edges shifting downwardly and upwardly respectively into confronting grooves of the shell frame.

After the panels have been erected in the manner described, locking bars are applied to the outer surface of the shell. Again, these are best shown in Figure 4, wherein it is seen that reinforcing posts 32, 34, 36 are respectively associated with locking bars 56, 58, 60.

It will be noted from Figure 4 that the outer faces of the inner reinforcing posts have longitudinal tongues or ribs formed thereon, extending between the adjacent side edges of adjacent panel sections. Then, with the panel sections assembled with the inner reinforcing posts in the manner previously described, the outer locking bars 56 are applied to the outer surfaces of the panel sections, overlapping said adjacent edges thereof, and screws or equivalent fastening elements are extended inwardly through the outer locking bars and the reinforcing posts, to secure the connection.

The frame of the shell includes, in addition to the reinforcing posts described, cross members 62, 64, 66 (see Figure 2), which extend transversely of the shell to support the roof portion thereof, between the upper ends of the corresponding, transversely aligned reinforcing posts. The cross members are formed with depending longitudinal ribs, to rigidify the same, these being shown to best advantage in Figures 2 and 3. The cross members, at their top surfaces, are formed with longitudinal ribs or tongues, to space adjacent edges of adjacent panel sections of the roof portion from each other, in the same maner that the vertical side posts space the edges of adjacent side panel sections.

Referring now to the roof portion, that is, the portion of the shell that extends between the sides thereof, it will be seen that this is supported not only upon the cross members 64, but upon a longitudinal frame member 68 (Figures 2 and 3) which is of downwardly facing, channel shape. The member 68 extends from the forward to the rear extremity of the frame, curving in the manner shown in Figure 2, at various locations along its length to impart the previously mentioned, form-fitting contour to the frame when the same is viewed in longitudinal section as in Figure 2. This is rigid, at the points at which it crosses the several cross members, with the respective cross members, and detachable or removable fastening elements, such as bolts, can be employed for this purpose.

In the construction of the shell which has so far been described, it will be seen that it includes a horizontally disposed, generally rectangular bottom frame assembly located in a horizontal plane, vertically extending side posts extending upwardly from the sides of the bottom frame, a longitudinal frame member disposed medially between the opposite sides of the frame and connected at its ends to the midlength portions of the ends of the bottom frame assembly, and cross members intersecting with the longitudinal member at selected locations along the lengths of the frame, and extending fully from side to side of the frame. A skeleton framework thus results, supporting the several panel sections.

Adapted to be connected to the tongues of the cross members are transverse locking bars 70, 72, 74 seen to best advantage in Figures 2 and 5. A longitudinal locking bar 76 is similarly connected to the upwardly projecting tongue of the longitudinal member 68. These locking bars are for the purpose of fixedly engaging to place side-by-side front end panels 78, and similarly arranged intermediate panels 80, 80 and 82, 82 in back of which are disposed rear end panels 84, 84.

A weathertight joint is made between the outer edges of the roofing panels 78 through 84 and the upper edges of the sides of the shell. This is best shown in Figure 3, and as will be noted, the upper panels of the sides of the shell have inwardly, downwardly directed lips 86, while the outer side edges of the roofing panels have downwardly, inwardly turned flanges 88. Key strips 90 engage in the lips and flanges and may be snapped into place or alternatively, are first connected to the side panels and then left in position to receive the roofing panels when the roofing panels are assembled with the longitudinal frame member and the cross members of the shell support frame.

This completes the construction of the shell 24. There will now be described the means for elevating and lowering the shell between the dotted and full line positions shown in Figures 2 and 3.

This means can be of various types, and it is contemplated that mechanical, pneumatic, or similar devices could be used. Preferably, however, and as shown, a hydraulic mechanism is utilized. This includes hydraulic cylinder assemblies, generally designated 92, located at opposite sides of and exteriorly of the shell, intermediate the opposite ends of the shell. The respective assemblies 92 are identically though oppositely constructed, so the description of one will, in general, suffice for both. Each assembly 92 includes an inwardly opening, approximately rectangular, relatively shallow cover plate 94, having a top wall sloping downwardly outwardly from the shell as shown in Figure 3, said top wall, as well as the side walls, being formed with a continuous attaching flange 96 (see Figure 6) bolted or otherwise secured to the adjacent side of the shell. Thus, the cover plates move upwardly and downwardly with the shell as will be noted from Figure 5 and also in dotted lines in Figure 3.

Within the space protectively enclosed by the cover plate 94, there is provided a hydraulic cylinder mounting or reinforcing plate 98. Plate 98, as shown in Figure 5, has inwardly directed end portions, and said end portions have upwardly projecting extensions 102 rigidifying the mounting plate, said extensions 102 being flanged and being fixedly connected to the outer side walls 12 of the respective runway tracks 10. A hydraulic cylinder means generally designated 106, is enclosed within the cover plate or housing 94, and includes like, vertically disposed, spaced hydraulic cylinders 108 which are bolted or otherwise fixedly secured at their lower ends to the associated cylinder mounting or stabilizing plate 98. In this connection, it is desirable that guide means be provided in association with the housing and cylinders, to insure the verticality of pistons 110 that work in the respective cylinders, during the elevation and lowering of the device, and to insure, further, the retention of all portions of the assembly 92 in proper alignment in these circumstances. To this end, at the corners of the housing 94 (see Figure 4) vertically disposed guide ribs 93 are rigidly secured to the inner surfaces of the housing and extend substantially the full height of the housing. Guide ribs 93, as shown in Figure 6, have their lower end portions extending downwardly below the bottom edge of the housing a substantial distance.

Fixedly secured to the side walls of the cylinders 108 are complementary guide ribs 109. Ribs 93, in cross section, are in the general shape of V-shaped tongues, while the ribs 109 have complementary V-grooves receiving the tongues.

Accordingly, when the shell is raised, lifting with it the housing 94 to the dotted line position of Figure 3, the ribs 93 slide in the ribs 109, and remain in engagement therewith even in the fully raised position of the housing 94 shown in Figure 6, through the provision of the depending extensions of the respective ribs 93.

Considering further the mechanism for elevating the shell, connected between the upper ends of the pistons or rams 110 is a horizontally disposed pulley support shaft 112 (Figures 3 and 4) and freely rotatable on shaft 112 are spaced pulleys 114 about which are trained lifting cables 116. Cables 116, intermediate their ends, are trained about pulleys 118 rotatably mounted upon the lower end portions of the respective cylinders 108, in confronting relation as shown in Figure 6.

At one end, the cables 116 are connected as at 120 to the shaft 112. At their other ends, the cables are connected at 122 to the bottom rails 26 (see Figure 3).

It will be apparent that on elevation of the pistons 112, the shell will be lifted to the dotted line position of Figure 3.

The extension of the pistons 110 results from the operation of pump means, electrically controlled, and reference should be had to Figure 7 for the control means for the piston and cylinder assemblies. As shown in this figure of the drawing, communicating at its ends with the lower ends of the cylinders 108, below the pistons 110, is a fluid supply line common to both cylinders and designated at 124. This communicates intermediate its ends with the outlet end of a main fluid supply line 126 which, as shown in Figure 7, extends through a rolled lip 128, formed upon the upper edge of the outer side wall 12, to the front end of the runway.

The lines 126 extending from the respective cylinder assemblies 92 extend into communication with a transversely extending branch 130 which is disposed crosswise of the front end of the runway as shown in Figure 5. Branch 130 is supplied from a line 132 extending from a power supply assembly generally designated 134. Assembly 134 is mounted between transversely extending members 136 fixedly connected between the inner sides of the respective tracks adjacent the front ends thereof, and includes a reservoir 38. A pump 140 has its input connected by a line 42 to the reservoir, and is driven by a motor 144. Line 132 is connected between the output of the pump and the branch 130, and in line 132 is a check valve 146 arranged to permit flow of fluid only in a direction from the output of the pump toward the branch 130.

Connected between line 132 and the reservoir, between the check valve 146 and branch 130, is a line 148 and within line 148 is a slide valve 150 (some other type of valve may be used) operated by a solenoid 152. When the solenoid is deenergized, the valve 150 shifts to a normally closed position shown in Figure 7.

Referring for the moment to Figures 3 and 6, a switch tripping cable or cord 154 is tied at one end to cylinder mounting plate 98, through an opening 155. In the lowered position of housing 94, trip cable 154 is in a slackened condition. At its other end, cable 154 is connected to the inner end of a vertically swingable, medially fulcrumed switch lever 156, the outer end of which projects exteriorly of the housing 94 so as to be capable of being manually thrown to an "on" position.

Fixedly connected to the lever 156 (see Figure 7) is a bridge member 158 of electrically conductive material. Bridge member 158 is adapted to bridge terminals on the ends of leads 159, 160. Lead 160 has a connection to a lead 162 extending from one side of a source of electric power, such as a common 110 A. C. house supply. Lead 159 extends to one side of the pump motor 144. The other side of the source of electric power has been designated at 164, and is connected to ground, the other terminal of the motor 144 also being connected to ground.

Therefore, if one swings the outer end of lever 156 downwardly, bridging element 158 will bridge the associated terminals, and will close a circuit through the motor 144, operating the pump 140. Therefore, pressure fluid will be pumped through line 142, check valve 146, line 132, branch 130, lines 126 and lines 124 to the lower ends of all four cylinders, elevating simultaneously the several pistons 110 to elevate the shell until it is in a position fully clearing the vehicle A so that the vehicle may be driven out of the enclosure or alternatively, driven thereinto.

Also connected to the lead 162 is a lead 166. A switch spaced vertically downwardly from the "up" switch previously described, and operable to lower the shell, includes a lever 168 having a transversely extending bridge element 170. Element 170 is adapted to bridge contacts between leads 166 and 172. Lead 172 as shown in Figure 7 extends to one terminal of the solenoid 152, the other terminal of the solenoid being connected to ground at 174.

Therefore, when the "down" switch is thrown to a closed position, current will flow through lead 162, lead 166, the "down" switch, lead 172 and the solenoid 152, and will return to its source through ground 174 and lead 164. Thus, closing of the "down" switch energizes the solenoid 152, operating the valve 150 to a position permitting the flow of fluid through the line 148. Therefore, under the weight of the shell, fluid will be forced out of the lower ends of the cylinders, back through the lines 126, 130 and 132. Since the check valve 146 operates only in a direction to permit flow from the pump, the fluid returning through line 132 will now travel through line 148 and open valve 150 back to the reservoir. The shell will thus slowly gravitate to its lowered position.

It may be noted, in connection with the "up" switch, that when the shell reaches the dotted line position of Figure 3, the trip cable 154 becomes taut, and exerts a downward pull on the inner end of the lever 156 (see Figure 3). This rocks the lever to a position opening the "up" switch, so as to immediately stop the motor 144 and thus prevent further upward movement of the shell.

Referring to Figure 3, embedded in the ground are upwardly opening guide tubes 176, these being adapted to receive the depending extensions of the guide ribs 93 when the shell is in its fully lowered position. Further, rigid with the plates 98 are depending anchors 178, also embedded in the ground for the purpose of rigidifying the mounting of the plates 98 to provide for still further stabilization of the cylinders 108.

Also, to further reinforce the shell, and as shown in Figure 1, a disc-shaped reinforcing plate 180 may be centrally disposed upon the roof of the shell, and is rigid with radially extending reinforcing ribs 182. A smaller, hold-down disc 184 receives angularly spaced bolts, extending into the longitudinal frame member 76 and the transverse frame member 64.

It should also be noted that additional reinforcement for the sides of the shell is desirable at the location of the hydraulic lifting mechanism 92. To this end vertically, inwardly facing channels 186 are secured to the inner surfaces of the side walls of the shell, and also are secured to the flanged sides of the respective housings 94. These not only provide a firm anchorage for the cylinder enclosures and housings 94, but also provide for positive reinforcement of shell at the locations at which the lifting cables 116 are connected thereto.

As will be obvious, the structure is an entirely self-contained unit, with the only portions of the unit that extend below the ground being the anchors 20 and 178, and guide tubes 176. The entire structure can be of prefabricated construction, and can be readily shipped in sections, in a compact form. Further, the structure can be swiftly and easily erected at any location at which desired, can be readily moved to other locations as for example when one is moving his residence, and can serve as portable garaging means for the military and for large commercial distributors of vehicles, as well as for the ordinary householder. The device can be mass produced at a central location for shipment to distant points, and is characterized by its ruggedness and its ease of operation, it being seen that the structure is lifted or dropped entirely by the operation of conveniently located switches.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A protective enclosure for vehicles comprising a stationary runway onto and off of which a vehicle may be driven; a shell overlying the runway and proportioned to fully enclose a vehicle; pairs of hydraulic cylinders stationarily mounted at opposite sides of the runway, one pair at each side; pistons working in the cylinders of each pair; a cross member connected between the pistons of each pair; pulleys freely rotatable upon said cross member; second pulleys rotatable upon the cylinders; and cables trained about the respective pulleys and connected at one end to said cross member at their other ends to the respective sides of the shell, for elevating the shell to a position wholly clear of the vehicle to permit movement of the vehicle onto and off of the runway, the stationary mounting of the cylinders at opposite sides of the runway comprising, for each pair of cylinders, a retaining plate fixedly secured to the cylinders and including means adapted for anchoring of the retaining plate to the ground, said retaining plate being fixedly connected to the adjacent side of the runway.

2. A protective enclosure for vehicles comprising a stationary runway onto and off of which a vehicle may be driven; a shell overlying the runway and proportioned to fully enclose a vehicle; pairs of hydraulic cylinders stationarily mounted at opposite sides of the runway, one pair at each side; pistons working in the cylinders of each pair; a cross member connected between the pistons of each pair; pulleys freely rotatable upon said cross member; second pulleys rotatable upon the cylinders; cables trained about the respective pulleys and connected at one end to said cross member at their other ends to the respective sides of the shell, for elevating the shell to a position wholly clear of the vehicle to permit movement of the vehicle onto and off of the runway, the stationary mounting of the cylinders at opposite sides of the runway comprising, for each pair of cylinders, a retaining plate fixedly secured to the cylinders and including means adapted for anchoring of the retaining plate to the ground, said retaining plate being fixedly connected to the adjacent side of the runway; and a housing for each pair of cylinders fixedly secured to the adjacent side of the shell for elevation and lowering thereof with the shell.

3. A protective enclosure for vehicles comprising a stationary runway onto and off of which a vehicle may be driven; a shell overlying the runway and proportioned to fully enclose a vehicle; pairs of hydraulic cylinders stationarily mounted at opposite sides of the runway, one pair at each side; pistons working in the cylinders of each pair; a cross member connected between the pistons of each pair; pulleys freely rotatable upon said cross member; second pulleys rotatable upon the cylinders; cables trained about the respective pulleys and connected at one end to said cross member at their other ends to the respective sides of the shell, for elevating the shell to a position wholly clear of the vehicle to permit movement of the vehicle onto and off of the runway, the stationary mounting of the cylinders at opposite sides of the runway comprising, for each pair of cylinders, a retaining plate fixedly secured to the cylinders and including means adapted for anchoring of the retaining plate to the ground, said retaining plate being fixedly connected to the adjacent side of the runway; a housing for each pair of cylinders fixedly secured to the adjacent side of the shell for elevation and lowering thereof with the shell; and interengaging, relatively slidable guide means on each housing and the retaining plate adjacent the same, adapted for guiding each housing in a vertical path during elevation and lowering of the same.

4. A protective enclosure for vehicles comprising a stationary runway onto and off of which a vehicle may be driven; a shell overlying the runway and proportioned to fully enclose a vehicle; pairs of hydraulic cylinders stationarily mounted at opposite sides of the runway, one pair at each side; pistons working in the cylinders of each pair; a cross member connected between the pistons of each pair; pulleys freely rotatable upon said cross member; second pulleys rotatable upon the cylinders; cables trained about the respective pulleys and connected at one end to said cross member at their other ends to the respective sides of the shell, for elevating the shell to a position wholly clear of the vehicle to permit movement of the vehicle onto and off of the runway, the stationary mounting of the cylinders at opposite sides of the runway comprising, for each pair of cylinders, a retaining plate fixedly secured to the cylinders and including means adapted for anchoring of the retaining plate to the ground, said retaining plate being fixedly connected to the adjacent side of the runway; a housing for each pair of cylinders fixedly secured to the adjacent side of the shell for elevation and lowering thereof with the shell; and interengaging, relatively slidable guide means on each housing and the retaining plate adjacent the same, adapted for guiding each housing in a vertical path during elevation and lowering of the same, comprising first, vertically disposed guide ribs on and projecting upwardly from each retaining plate, and second, vertically disposed guide ribs complementing the first guide ribs and fixedly secured to the housing.

5. A protective enclosure for vehicles comprising a stationary runway onto and off of which a vehicle may be driven; a shell overlying the runway and proportioned to fully enclose a vehicle; pairs of hydraulic cylinders stationarily mounted at opposite sides of the runway, one pair at each side; pistons working in the cylinders of each pair; a cross member connected between the pistons of each pair; pulleys freely rotatable upon said cross member; second pulleys rotatable upon the cylinders; cables trained about the respective pulleys and connected at one end to said cross member at their other ends to the respective sides of the shell, for elevating the shell to a position wholly clear of the vehicle to permit movement of the vehicle onto and off of the runway, the stationary mounting of the cylinders at opposite sides of the runway comprising, for each pair of cylinders, a retaining plate fixedly secured to the cylinders and including means adapted for anchoring of the retaining plate to the ground, said retaining plate being fixedly connected to the adjacent side of the runway; a housing for each pair of cylinders fixedly secured to the adjacent side of the shell for elevation and lowering thereof with the shell; and interengaging, relatively slidable guide means on each housing and the retaining plate adjacent the same, adapted for guiding each housing in a vertical path during elevation and lowering of the same, comprising first, vertically disposed guide ribs on and projecting upwardly from each retaining plate, and second, vertically disposed guide ribs complementing the first guide ribs and fixedly secured to the housing, the second guide ribs having extensions at their lower ends projecting downwardly below the lower end of the associated housing, for retention of the first and second guide ribs in slidable interengagement in the elevated position of the shell.

References Cited in the file of this patent

UNITED STATES PATENTS

| 1,261,812 | Higgins | Apr. 9, 1918 |
| 2,189,486 | D'Amico | Feb. 6, 1940 |
| 2,693,620 | Berman | Nov. 9, 1954 |
| 2,740,997 | Gipslis | Apr. 10, 1956 |
| 2,742,674 | Melder | Apr. 24, 1956 |

FOREIGN PATENTS

| 250,303 | Switzerland | June 1, 1948 |
| 613,557 | Great Britain | Nov. 30, 1948 |